US005962109A

United States Patent [19]

Schwietz

[11] Patent Number: 5,962,109

[45] **Date of Patent: *Oct. 5, 1999**

[54] CHANGEABLE GRAPHICS AND METHODS OF MAKING AND USING SAME

[75] Inventor: William T. Schwietz, West Lakeland Township, Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,232

[22] Filed: Jan. 8, 1997

[51] Int. Cl.[6] .......... B32B 3/00

[52] U.S. Cl. .......... 428/195; 428/204; 428/411.1; 428/913; 156/60; 156/230

[58] Field of Search .......... 428/195, 204, 428/411.1, 913; 156/60, 230

[56] References Cited

U.S. PATENT DOCUMENTS

| | | | |
|---|---|---|---|
| 4,673,609 | 6/1987 | Hill | 428/187 |
| 4,883,556 | 11/1989 | Leavitt, Sr. et al. | 156/273.3 |
| 4,925,905 | 5/1990 | Boeckh et al. | 526/208 |
| 5,525,177 | 6/1996 | Ross | 156/240 |
| 5,542,202 | 8/1996 | Brugger | 40/576 |

FOREIGN PATENT DOCUMENTS

| | | |
|---|---|---|
| 2 702 296 | 3/1993 | France . |
| WO 97/16812 | 5/1997 | WIPO . |

OTHER PUBLICATIONS

Derwent Abstract for French Patent 2 702 296.

3M Image Graphics "Tips fore Translucents" (1996).

*Primary Examiner*—Elizabeth Evans
*Attorney, Agent, or Firm*—Dale A. Bjorkman

[57] ABSTRACT

A backlit sign and its method of making and usage is disclosed. The sign has a translucent film with a first image, of color, a light-filtering film with a second image of color or of a graphic, and a masking film with a third image of a graphic. The order of assembly of the films determines whether a change of color or a change in graphics or both is achieved when the assembled sign is backlit.

10 Claims, 3 Drawing Sheets

CHANGEABLE GRAPHICS AND METHODS OF MAKING AND USING SAME

FIELD OF INVENTION

This invention relates to a sign that permits passive change in an image of color or graphics, or both, because of a change in lighting conditions.

BACKGROUND OF INVENTION

Three elements of eye-catching advertising are color, light, and motion. Large stationary image graphics often use colors and lights to attract attention. For example, billboards can have images with vibrant colors and be front-lit at night to maintain the same image during nighttime. Other large signs add the third element of motion such as by using neon tubes to change the image of one message to another message, e.g., a flashing "NO" in front of "Vacancy" outside a motel when the motel rooms are fully occupied. In both instances, lighting from in front of the sign determines its appearance to the viewer.

The Commercial Graphics Division of Minnesota Mining and Manufacturing Company (3M) publishes recommendations for use by the signage industry when producing back-lit signs, such as signs that identify a building both during the day without lighting and at night with lighting from behind the sign. The publication, "Tips for Translucents" recommend use of 3M™ Panaflex™ branded and 3M™ Scotchcal™ branded films permit construction of complex, color images for daytime and nighttime viewing. One tip published by 3M is called "Color by Day, White by Night" wherein the daytime image is formed with a series of striped elements of colors and translucents which images "disappears" when backlit because the luminence of the backit source passing through the translucent portions of the elements dominates the unlit color portions of the elements. Color, light, and motion are achieved in a backlit sign, but while the motion is obtained by the disappearance of the image when backlit at nighttime, that image is not replaced by another image.

SUMMARY OF INVENTION

The art needs a signage article that can be backlit at night to change a daytime image to a nighttime image, whether the change of image is a change of color or a change of graphics, or both.

In describing this invention, an "image" means an appearance of color, an appearance of a graphic, or both. Thus, a film of a solid color is imaged, just as is a film of combination of colors creating a graphic of a flower or the word "Vacancy".

One aspect of the invention is a signage article, comprising at least one translucent film having a first image thereon, at least one light-filtering film having a second image thereon, and at least one masking film having a third image thereon.

Another aspect of the invention is a method of making a signage article, comprising the steps of laminating a translucent film having a first image thereon to one major surface of a supporting film, laminating a light-filtering film having a second image thereon to an opposing major surface of the supporting film, and laminating a masking film having a third image thereon to an exposed surface of the light-filtering film.

A method of making a signage article, comprising the steps of (a) laminating a translucent film having a first image thereon to one major surface of a masking film, (b) laminating a supporting film thereon to an opposing major surface of the masking film, and (c) laminating a light-filtering film having a second image thereon to an exposed surface of the supporting film, wherein the masking film has a third image thereon.

Another aspect of the invention is a method of using the signage article in commercial graphics, comprising the steps of (a) assembling a sign comprising at least one translucent film having a first image thereon, at least one light-filtering film having a second image thereon, and at least one masking film having a third image thereon, and (b) lighting the sign from behind the translucent film.

A feature of the invention is an ability using backlighting sources to change either color or graphics or both as an image graphic operates in a nighttime mode.

An advantage of the invention is an ability to change messages or appearances whenever a backlit luminence exceeds frontlit luminence.

Other features and advantages are described with respect to embodiments of the invention and the following drawings.

EMBODIMENTS OF INVENTION

Figure 1:
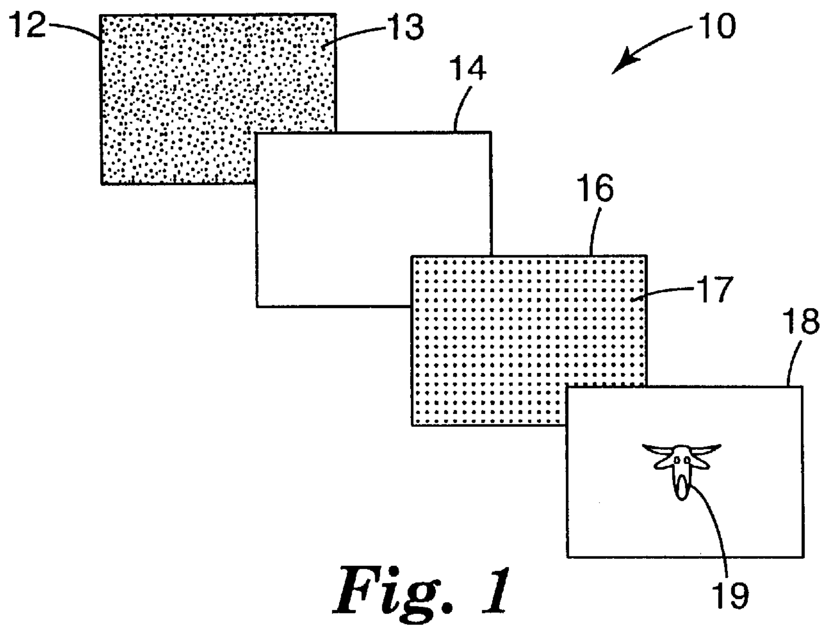
FIG. 1 is one embodiment of the invention showing a change of image from one color to another color for one graphic.

FIG. 1 shows a signage article 10 that preferably comprises at least four layers of films: a translucent film 12 having one image 13 of color thereon, an optional supporting film 14, a light-filtering film 16 having a second image 17 of color thereon, and a masking film 18 having a third image 19 of a graphic thereon. Optional film 14 provides supporting structure if films 12, 16, and 18 are of insufficient strength to withstand expected usage conditions, such as outdoor signage in windy conditions.

When assembled in the order of film 12, film 14, film 16, and film 18, image 19, a graphic, having a color provided by image 17, is seen in the daytime or whenever luminence on film 18 exceeds luminence from behind film 12. However, when backlit at nighttime or whenever luminence from behind film 12 exceeds film luminence on film 18, the graphic image 19 changes color provided by image 13. For example, if image 13 is red and image 17 is blue, the graphic image 19 changes from blue to red as sign 10 becomes backlit at a luminence that exceeds light striking film 18.

Commercially available films can be used for each of films 12, 14, 16, and 18. Nonlimiting examples of commercially available films for translucent film 12 are 3M™ Scotchcal™ branded translucent Series 3630 films from 3M of St. Paul, Minn. These films are available in a variety of colors that provide the same variety of images 13 thereon.

Nonlimiting examples of commercially available films for structural film 14 are 3M™ Panaflex™ branded translucent Series 600 and Series 645 films from 3M.

Nonlimiting examples of commercially available films for light-filtering films 16 are 3M™ Scotchcal™ branded Perforated 8171 and 8671 films from 3M; films disclosed in U.S. Pat. Nos. 4,673,609 (Hill); 4,925,905 (Hill); 4,883,556 (Leavitt et al.); and 5,525,177 (Ross); and films disclosed in PCT Patent Application US96/09888 (Mueller et al.). Image 17 of color can be placed on film 16 using electrostatic imaging techniques, electrophotographic imaging techniques, screen printing techniques, inkjet printing techniques, gravure printing techniques, offset printing techniques, and other commercial available printing techniques. Of these techniques, screenprinting is preferred because economies of scale during manufacture and denser color printing results.

Nonlimiting examples of commercially available films for masking film 18 are 3M™ Scotchcal™ branded Blockout 3635-10 film from 3M. Image 19 of a graphic can be formed by using electrocutting techniques using cutting equipment such as Zünd P1200 Universal Precision Plotter from Zund Systemtecknik AG of Altstaitten, Switzerland.

Figure 2:
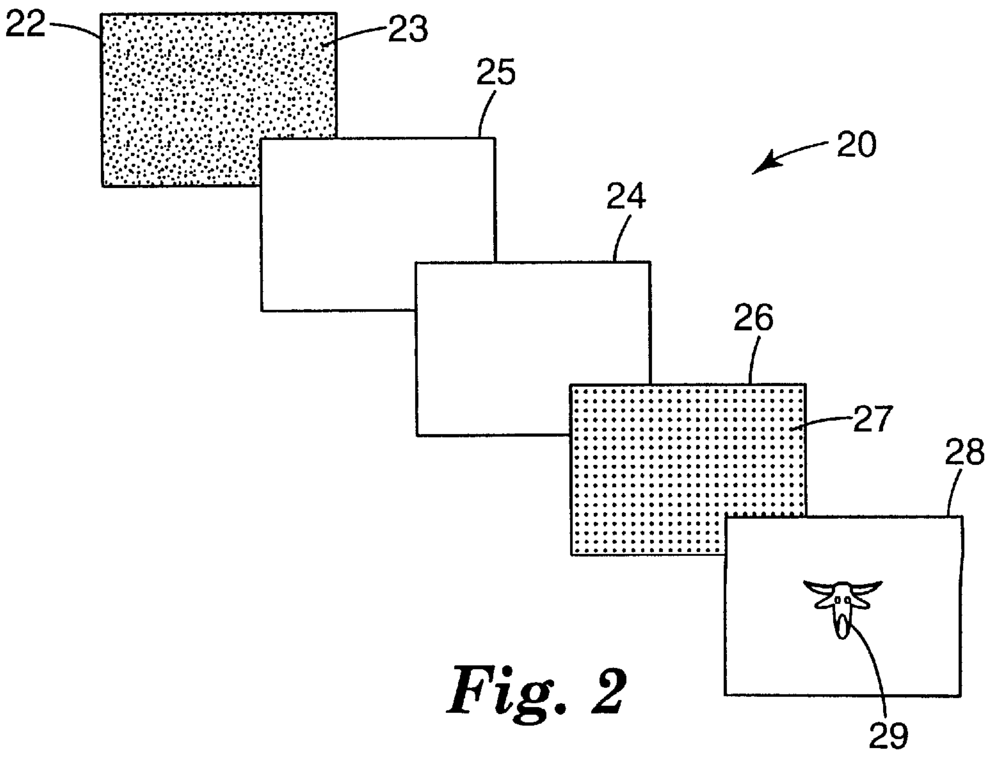
FIG. 2 is another embodiment of the invention showing a change of image from one color to another color for another graphic.

Signage article 20 seen in FIG. 2 corresponds for films 22, 26, and 28 to films 12, 16, and 18, respectively from sign 10 of FIG. 1. Sign 20 differs from sign 10 in that supporting film 14 is replaced by the combination of a supporting sheet 24 of clear plastic or glass and a diffuser film 25 on the side of sheet 24 adjacent film 22. Diffuser film 25 hides the color of film 22 when sign 20 is frontlit. Thus, image 23 of one color replaces image 27 of another color for image graphic 29 when sign 20 is backlit.

Figure 3:
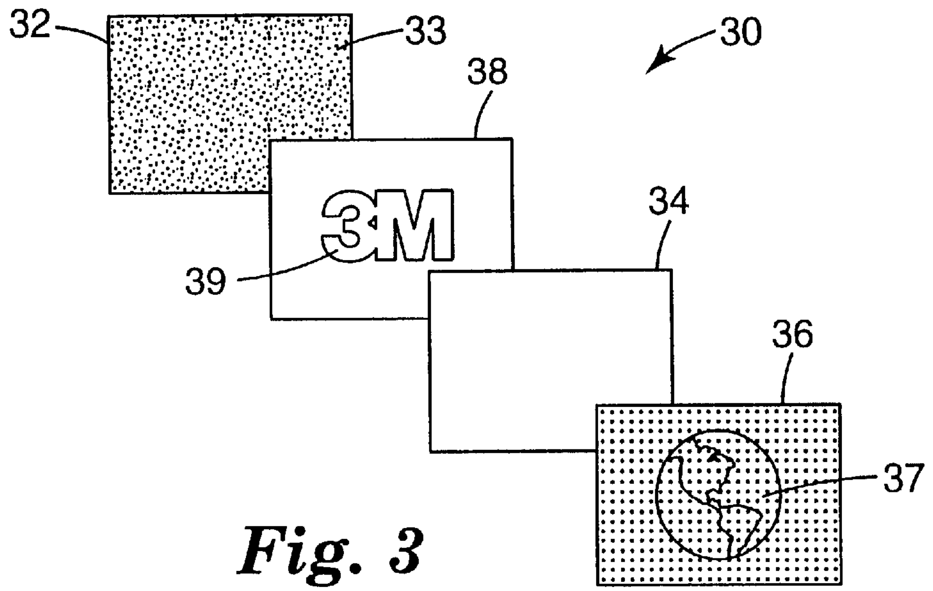
FIG. 3 is one embodiment of the invention showing a change of image from one graphic to another graphic.
Figure 4:
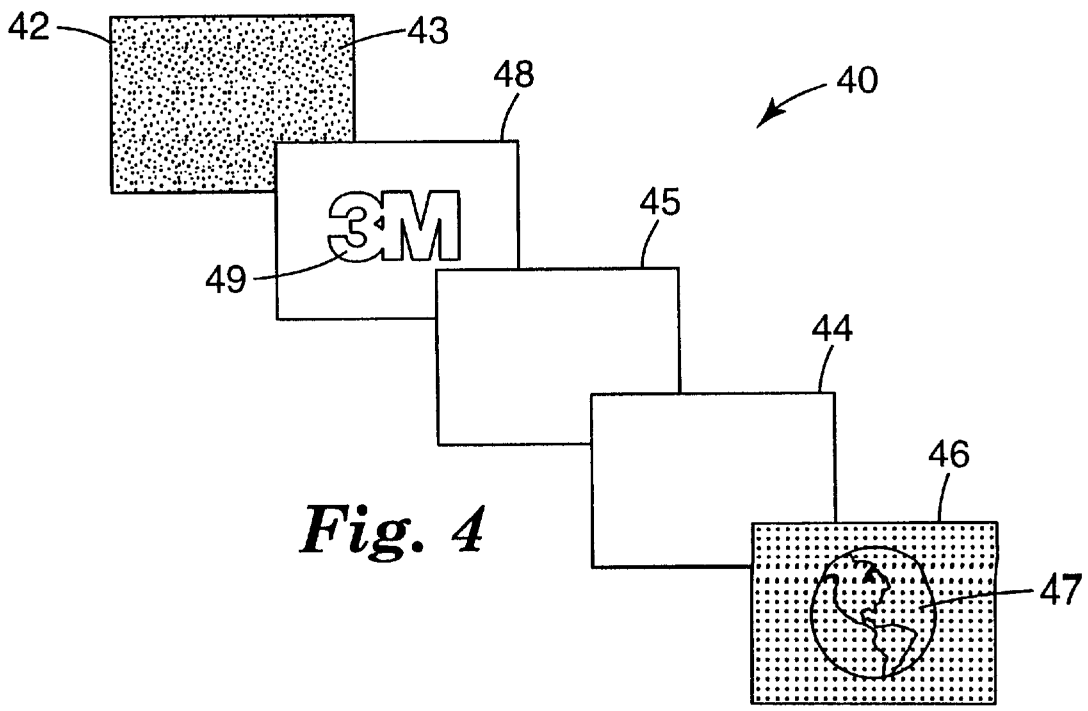
FIG. 4 is another embodiment of the invention showing a change of image from one graphic to another graphic.

The embodiments of FIGS. 3 and 4 differ from the embodiments of FIGS. 1 and 2 in the order of assembly of films forming the sign. Sign 30 corresponds to sign 10 for films 32, 34, 36, and 38, except that masking film 38, rotates position to between translucent film 32 and supporting film 34.

With this order of assembly, image 33 remains the color to be seen when sign 30 is backlit but image 37 on film 36 becomes the "daytime" image and image 39 on film 38 becomes the "nighttime" image. Because image 37 is now exposed for daytime viewing, either a color or a graphic can be used for image 37. If a color is used, a "blank daytime" sign becomes a "graphic nighttime" sign when image 39 becomes backlit, resulting in a change of graphics for sign 30. The color of image 37 can be the same or different from the color of image 33. If a graphic is used for image 37, that graphic is changed to the graphic of image 39 when sign 30 becomes backlit. Printing image 37 can use any of the printing techniques described with respect to image 17, with screenprinting or electrostatic printing being preferred. The selection of colors to be used in the graphic for image 37 can be the same or different as image 33. If the same, then graphics change without a change of color when sign 30 is backlit. If different, then both a change of graphics and of color occur when sign is backlit.

Image 39 can be formed on film 38 using 3M™ Scotchcal™ branded Blockout 3635-12 film from 3M that has been "reverse-cut" using electrocutting or thermal transfer printing techniques known to those skilled in the art.

FIG. 4 shows a signage article 40 that corresponds to sign 20, except that the order of assembly of films 42, 46, and 48 corresponds to the order of assembly for sign 30, with supporting sheet 44 and diffuser film 45 (corresponding to films 24 and 25) replacing supporting film 34. The use of same or different colors on image 43 from that used on image 47 provides options to those skilled in the art to make a changeable color sign in addition to a changeable graphic sign, based on the differences in graphics between image 47 and 49. Image 49 can be formed in the same manner as image 39 on sign 30.

Figure 5:
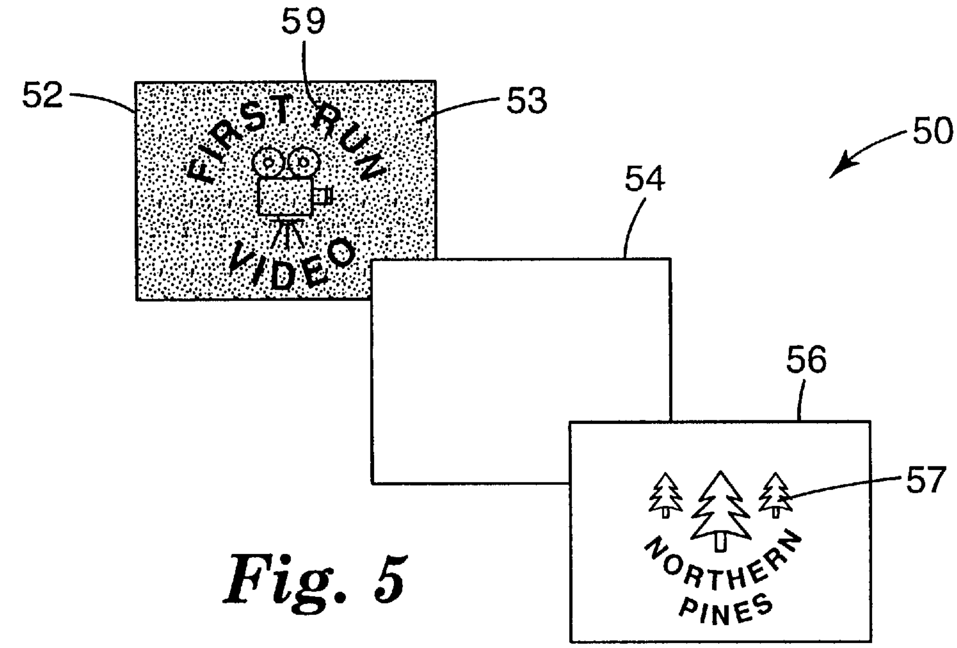
FIG. 5 is one embodiment of the invention showing a change of image from one graphic to another graphic.

FIG. 5 shows a sign 50 that corresponds to sign 30 except that the functions of films 32 and 38 are combined in film 52 with both images 33 and 39 overlaid as image 53 of color and image 59 of a graphic. Supporting sheet 54 corresponds to sheet 34, and light-filtering film 56 with image 57 thereon correponds to film 36 with image 37 thereon.

Figure 6:
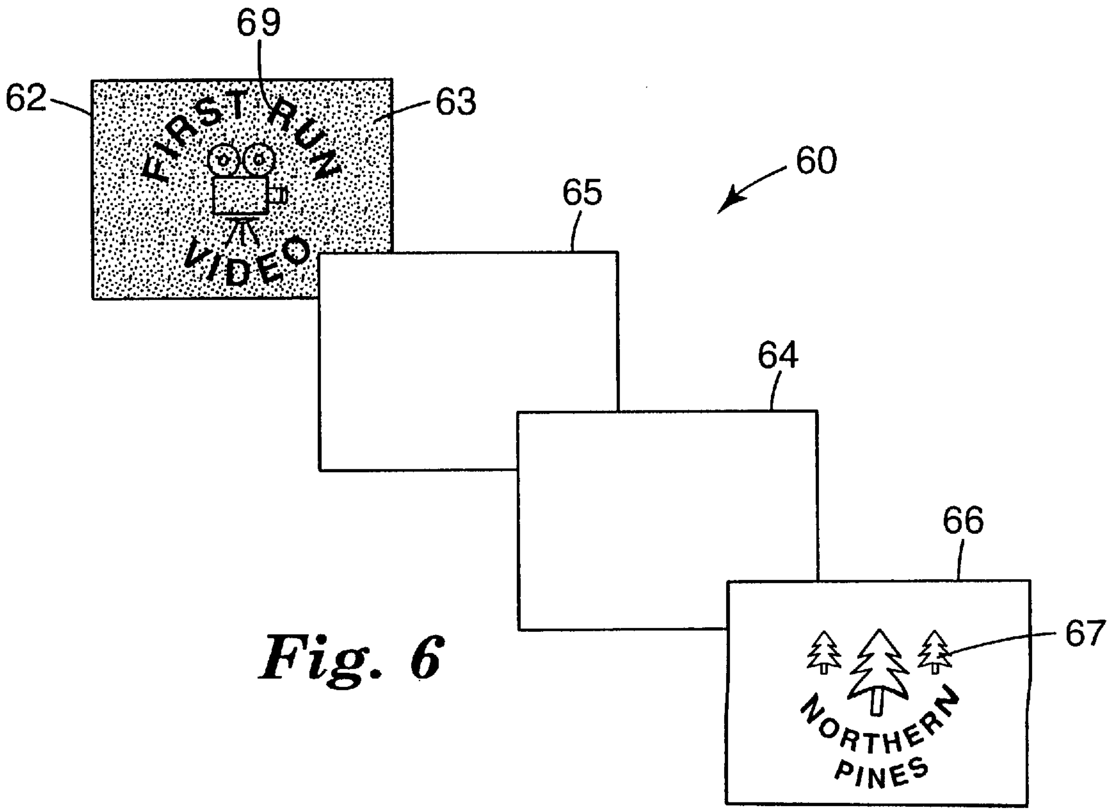
FIG. 6 is another embodiment of the invention showing a change of image from one graphic to another graphic.

FIG. 6 shows a sign 60 that corresponds to sign 40 except that the functions of films 42 and 48 are combined in film 62 with both images 43 and 49 overlaid as image 43 of color and image 49 of a graphic. Supporting sheet 64 corresponds to sheet 44; diffuser film 65 corresponds to diffuser film 45; and light-filtering film 66 with image 67 thereon correponds to film 46 with image 47 thereon.

Assembly of signs 10, 20, 30, 40, 50, and 60 follow known techniques in the art of signage construction, such as those described in "Tips For Translucents" (3M Commercial Graphics Division, St. Paul, Minn. 1994), the disclosure of which is incorporated by reference herein. The order of assembly depends on the type of changing image desired, as can be seen in the differences of assembly order for signs 10 and 20 in FIGS. 1 and 2 from that for signs 30 and 40 seen in FIGS. 3 and 4 and from that for signs 50 and 60 seen in FIGS. 5 and 6. Further, the arrows adjoining the various films in FIGS. 1–6 show the order of assembly.

For example for sign 10, one can laminate film 12 on one major surface of film 14 and film 16 on the other major surface of film 14, followed by laminating of film 18 on the exposed surface of film 16. Assembly for signs 20, 30, 40, 50, and 60 follow analogously. Preferably each of films 12, 16, and 18 are adhesive backed for facile and secure lamination.

The number of films in signs 10, 20, 30, 40, 50, and 60 can be increased for additional changes in color or graphics if additional lighting sources are provided.

For example, one can provide multiple color, sequential backlit images through any of signs 10, 20, 30, 40, 50, and 60. To achieve multiple color images for sign 10, one could place angled mirrors from multiple light sources or light polarizers from a single light source behind multiple images 13 on multiple films 12. Then a sequence of backlighting for each of multiple films would provide different colors for images 13, changing the color of image 19 during backlighting. Similar sequential backlighting for signs 20, 30, 40, 50, and 60 can also be achieved in an analgous fashion.

For example, one can provide multiple graphic, sequential through any of signs 30, 40, 50, and 60. To achieve multiple graphic images for sign 30, one could place angled mirrors from multiple light sources or light polarizers from a single light source behind multiple images 39 on multiple films 38. Then a sequence of backlighting for each of multiple films would provide different graphics for images 39, sequentially changing the graphics of image 37 to a sequence of images 39 during backlighting. Similar sequential backlighting for sign 40 can also be achieved in an analgous fashion.

One could combine sequential backlighting of images 33 and 43 with sequential backlighting of images 39 and 49 to provide a myriad of combinations of graphics and colors for signs 30 and 40 when backlighting is desired.

To provide sequencing, one skilled in the art can use any electrical or electronic circuit, appropriately wired to backlighting sources as desired.

The invention is not limited to the preceding embodiments. The claims follow.

What is claimed is:

1. A signage article, comprising at least one translucent film having a first image thereon, an optional supporting film or sheet, at least one light-filtering film having a second image thereon, and at least one masking film having a third image thereon, wherein the films are assembled by lamination in the order of the translucent film, the supporting film or sheet if present, the light-filtering film, and the masking film or in the other of the translucent film, the masking film, the supporting film or sheet if present, and the light-filtering film.

2. The article of claim 1, wherein the first image is a color, the second image is a color, and the third image is a graphic, and wherein the light-filtering film is a perforated film.

3. The article of claim 1, wherein the first image is a color, the second image is a graphic, and the third image is a graphic.

4. The article of claim 1, further comprising a diffuser film between the translucent film and the supporting sheet.

5. The article of claim 1, further comprising a diffuser film between the masking film and the supporting sheet.

6. A method of making a signage article, comprising the steps of:

(a) laminating a translucent film having a first image thereon to one major surface of a supporting film, (b) laminating a light-filtering film having a second image thereon to an opposing major surface of the supporting film, and (c) laminating a masking film having a third image thereon to an exposed surface of the light-filtering film.

7. The method of claim 6, wherein the supporting film comprises a plastic or glass sheet and a diffuser film, and wherein the light-filtering film is a perforated film.

8. A method of making a signage article, comprising the steps of:

(a) laminating a translucent film having a first image thereon to one major surface of a masking film, (b) laminating a supporting film thereon to an opposing major surface of the masking film, and (c) laminating a light-filtering film having a second image thereon to an exposed surface of the supporting film, wherein the masking film has a third image thereon.

9. The method of claim 8, wherein the supporting film comprises a plastic or glass sheet and a diffuser film and wherein the light-filtering film is a perforated film.

10. A method of using a signage article, comprising the steps of:

(a) assembling a sign comprising at least one translucent film having a first image thereon, an optional supporting film or sheet, at least one light-filtering film having a second image thereon, and at least one masking film having a third image thereon, wherein the films are assembled in the order of the translucent film, the supporting film or sheet if present, the light-filtering film, and the masking film or in the order of the translucent film, the masking film, the supporting film or sheet if present, and the light-filtering film, and (b) lighting the sign from behind the translucent film, and wherein the light-filtering film is a perforated film.

* * * * *

UNITED STATES PATENT AND TRADEMARK OFFICE

CERTIFICATE OF CORRECTION

PATENT NO. : 5,962,109
DATED : October 5, 1999
INVENTOR(S) : Schwietz

It is certified that error appears in the above-identified patent and that said Letters Patent is hereby corrected as shown below:

In column 3, line 23, delete "Alstaitten" and insert -- Alstätten --.

In Claim 1, in column 5, line 11, delete "other" and insert -- order --.

Signed and Sealed this

Tenth Day of April, 2001

Attest:

Nicholas P. Godici

NICHOLAS P. GODICI

*Attesting Officer*

*Acting Director of the United States Patent and Trademark Office*